(No Model.)
H. DE CASTRO.
MANUFACTURE OF SOAP.
No. 288,412. Patented Nov. 13, 1883.
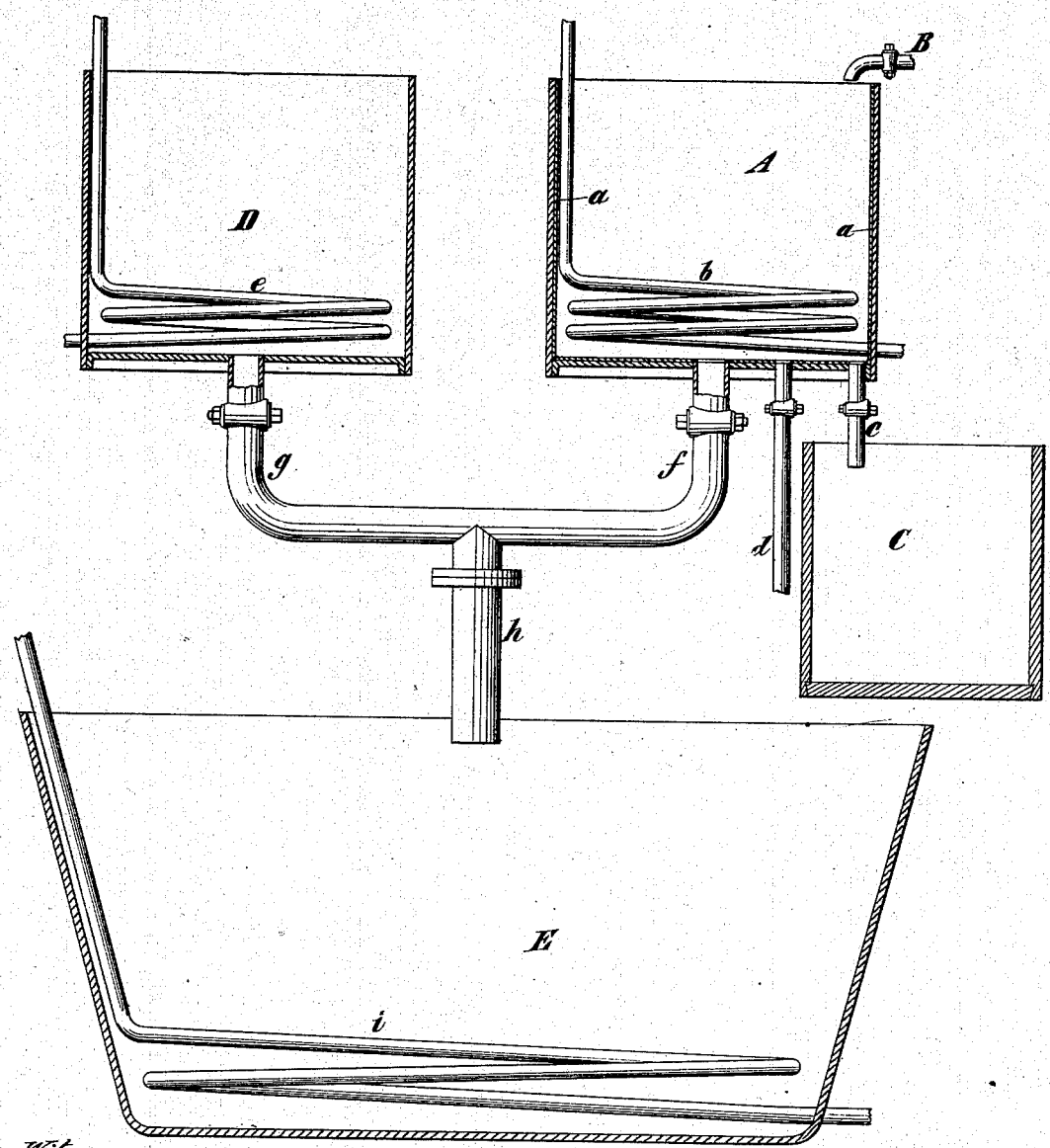
Witnesses:
Chandler Hall
James R. Bowen
Inventor:
Hector de Castro,
by his attorney
Edwin H. Brown

UNITED STATES PATENT OFFICE.

HECTOR DE CASTRO, OF NEW YORK, N. Y., ASSIGNOR TO JOHN W. MACKAY, OF VIRGINIA CITY, NEVADA.

MANUFACTURE OF SOAP.

SPECIFICATION forming part of Letters Patent No. 288,412, dated November 13, 1883.

Application filed July 11, 1883. (No model.)

*To all whom it may concern:*

Be it known that I, HECTOR DE CASTRO, of New York, in the county and State of New York, have invented a certain new and useful Improvement in the Manufacture of Soap, of which the following is a specification.

My improvement relates to the manufacture of soap with fatty acids; and it is designed to secure an effective saponification, and to obviate the coloring of the stock through the oxidation of the iron pans or vats which are used by the contact of the fatty acids with them.

The accompanying drawing is a sectional elevation of an apparatus which may be used in carrying out my improvement.

The fatty acids which are produced through the decomposition of fats and oils are blown off or otherwise conducted from a digester, in which the decomposition has taken place, to a tank or vat, A. I have shown a pipe, B, which leads to this tank from a digester. This tank A preferably has a lining, $a$, of lead. It is fitted with a coiled lead pipe, $b$, through which steam is circulated from any suitable source. This tank A also has a pipe, $c$, connected to it, for carrying off glycerinous waters, and another pipe, $d$, for carrying off water employed to wash the fatty acids. Both these pipes $c\ d$ are provided with cocks to control the passage of liquid through them.

C is a tank into which glycerinous waters are discharged by the pipe $c$.

D designates a tank or vat, which may be made of iron, and in which caustic lye is placed. A coiled pipe, $e$, is arranged in this tank or vat, and connected with any suitable source of steam. From the bottom of the tank or vat A a pipe, $f$, extends, and from the bottom of the tank or vat D a pipe, $g$, extends. These two pipes are provided with cocks, to control the passage through them of the contents of the tanks or vats A D. These pipes $f\ g$ are connected by a coupling or otherwise with a pipe, $h$, having an internal area equal to about the aggregate internal area of the pipes $f\ g$. Preferably the pipe $f$ will be made of copper or zinc or of galvanized iron. The pipe $h$ will also preferably be made of one of these materials. These pipes $f\ h$ may, however, be made of iron only. The pipe $g$ may be made of iron. The pipe $h$ discharges into a pan, E, which may be made of iron. This is, as usual, furnished with a coiled pipe, $i$, into which steam is admitted to heat the contents of the pan.

After the fatty acids have been introduced into the tank or vat A, they are allowed to settle, and the glycerinous waters are subsequently run off through the pipe $c$ into the tank C. After the glycerinous waters have been run off and the cock of the pipe $c$ has been closed, I introduce into the tank A a quantity of pure water. I then allow steam to enter the coiled pipe $b$ of the tank to boil the contents of the tank. I allow the contents to boil for about five or ten minutes. After the boiling of the contents of the tank has been stopped, I allow the contents to settle until the water and impurities gravitate to the bottom of the tank. The cock of the pipe $d$ is then opened and the water and impurities are allowed to run off. This water may be allowed to run to waste, or it may be treated for the purpose of saving whatever glycerine may be in it. The lye in the tank D is made to boil by admitting steam into the coiled pipe $e$ of this tank. It may be necessary to admit steam again into the coiled pipe $b$ of the tank A, to heat the fatty acids therein, if they do not remain hot enough to continue liquid after the settling and removal of the water which was introduced to remove impurities. The cocks of the pipes $f\ g$ are now opened, and the fatty acids are allowed to pass from the tank A through the pipe $f$, and the lye is permitted to pass from the tank D through the pipe $g$. The fatty acids and lye flowing through the pipes $f\ g$ meet and commingle in the pipe $h$, and thereupon a partial saponification occurs within the pipe $h$. It is to prevent the fatty acids from producing any oxidation of the pipes $f\ h$, which would be detrimental to the stock, that I prefer to make these pipes of copper, zinc, or galvanized iron. As the flow of liquid through these pipes will, however, be very rapid, I believe the pipes may be made entirely of iron without leading to any serious deterioration of the stock. Owing to the partial saponification in the pipe $h$, the liquid entering into the pan E will not act on the same so as to produce any oxidation which would seriously affect the stock.

Preferably the lye which is first used is strong concentrated lye, and at stages subsequent to the initial boiling of the mixture comprising the first lye, lyes successively weaker and weaker are added. The strong concentrated first lye may be introduced through the tank or vat D, and the weaker lyes may be introduced directly into the pan E.

It is advisable to wash with pure water the fatty matters and oils which are to be used before their introduction into the digester.

I do not wish to claim, broadly, making soap from fats or oils by first removing the glycerine therefrom and then saponifying the residual stock.

What I claim as my invention, and desire to secure by Letters Patent, is—

1. In the manufacture of soap, the process consisting in removing the glycerinous waters, in afterward introducing water into the tank or vat which contains the fatty acids, in subsequently boiling the contents of the tank or vat, in afterward allowing the contents to settle, and in finally removing the water and impurities, substantially as specified.

2. In the manufacture of soap, the process consisting in mixing and commingling fatty acids and lye before their introduction into the soap-pan, substantially as specified.

3. In the manufacture of soap with fatty acids, the process consisting in first using a strong concentrated lye and subsequently using weaker lyes, substantially as specified.

4. The combination, with a tank or vat for fatty acids, a tank or vat for lye, and a soap-pan, of a pipe leading from the tank or vat for fatty acids, a pipe leading from the tank or vat for lye, and a pipe which receives the contents of both said pipes and delivers the same into the soap-pan, substantially as specified.

HECTOR DE CASTRO.

Witnesses:
  T. J. KEANE,
  ALFRED DE CASTRO.